(No Model.)
C. L. BARRETT.
ROAD CART.
No. 384,820. Patented June 19, 1888.
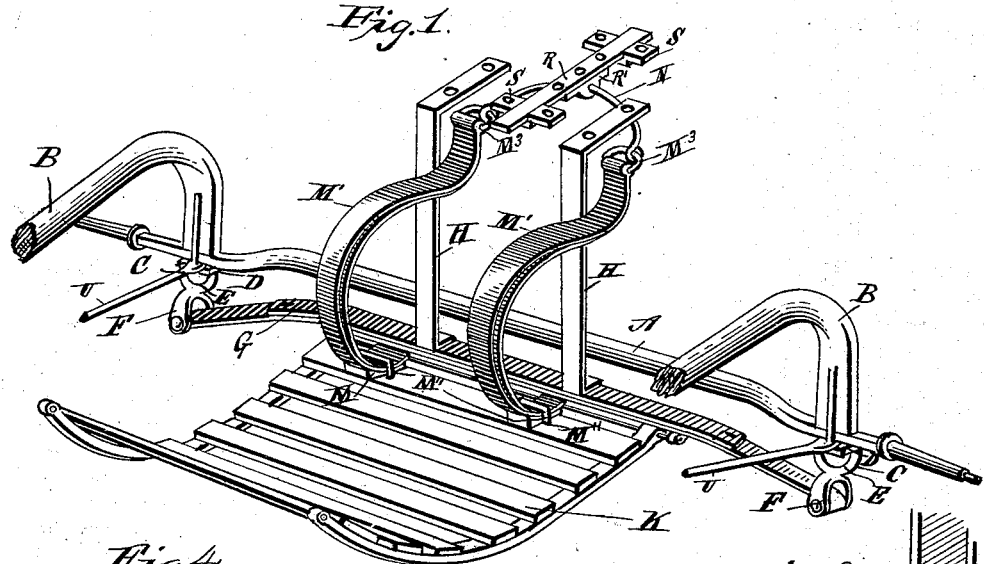
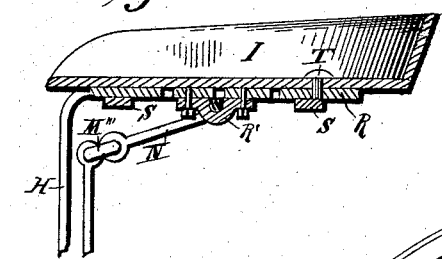
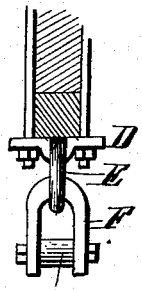
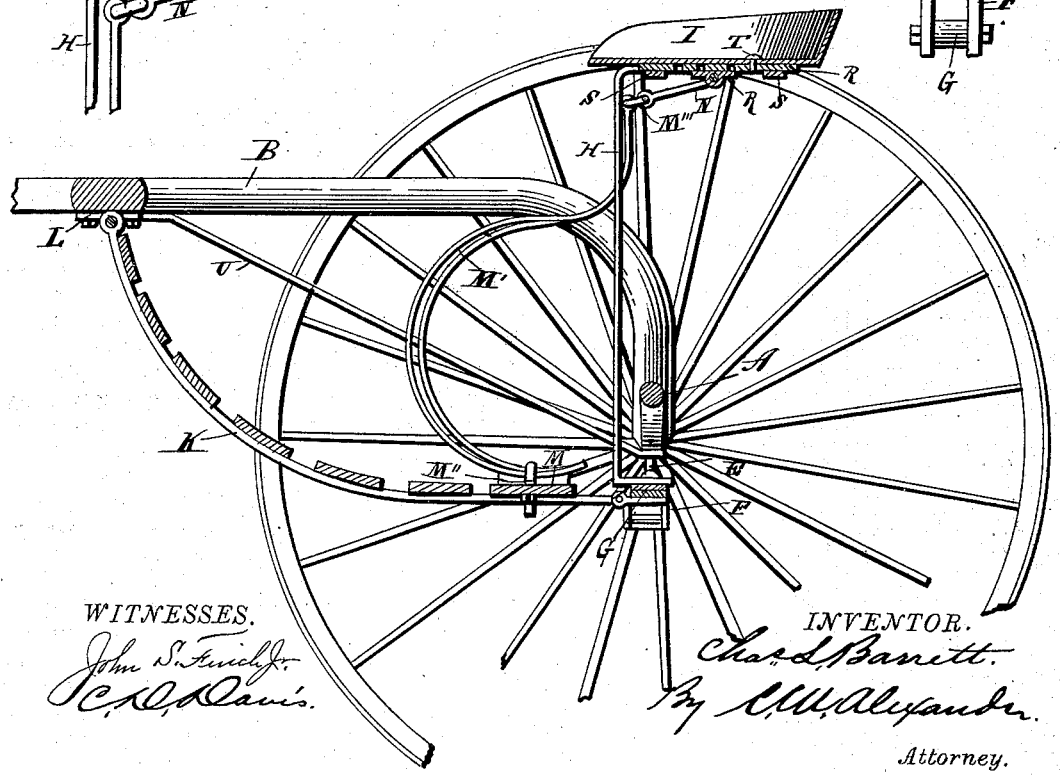
WITNESSES.
John S. Finch Jr.
C. A. Davis.
INVENTOR.
Chas. L. Barrett.
By C. W. Alexander.
Attorney.

UNITED STATES PATENT OFFICE.

CHARLES L. BARRETT, OF ALLEGAN, MICHIGAN.

ROAD-CART.

SPECIFICATION forming part of Letters Patent No. 384,820, dated June 19, 1888.

Application filed February 17, 1888. Serial No. 264,417. (No model.)

*To all whom it may concern:*

Be it known that I, CHARLES L. BARRETT, a citizen of the United States, residing at Allegan, in the county of Allegan and State of Michigan, have invented certain new and useful Improvements in Road-Carts, of which the following is a specification, reference being had therein to the accompanying drawings.

This invention relates to certain improvements in road-wagons or other vehicles; and it has for its objects, essentially, to provide for a movement of the seat, its supports, the spring, and foot-rest of the wagon independent of the axle, so as to prevent the oscillation of the seat due to the motion of the axle, and also to provide for adjusting the seat-springs, so as to adapt it to a light or heavy weight, as more fully hereinafter specified.

The invention relates particularly to improvements upon the vehicle covered by Letters Patent No. 375,979, issued to me January 3, 1888.

These objects I attain by the means illustrated in the accompanying drawings, in which—

Figure 1 represents a perspective view of the body of the wagon with the seat detached; Fig. 2, a longitudinal vertical sectional view through the body of the wagon and seat. Fig. 3 represents a detached view of the coupling connecting the axle and the spring below it; and Fig. 4 represents a detached sectional view through the seat, showing more clearly the manner of adjusting the same.

Referring to the drawings, the letter A indicates the axle of the wagon, to which the thills B are rigidly secured by means of the clips C. The clips C are formed or otherwise provided with bearings D for the rings E of the couplings or clevises F, which latter are pivoted to or otherwise loosely connected with the ends of the spring G, which is located directly below the axle and in line therewith. As shown in Fig. 1, the ring is connected to and forms part of the coupling; but I prefer to construct it separately and secure it loosely under the bend at the upper part of the coupling, as shown in Fig. 3 of the drawings.

To the upper face of the spring are rigidly attached the standards H, which support the seat I, and to the front edge of said spring is hinged or otherwise loosely connected the rear edge of the curved foot-rest K, the forward edge of which at the corners is hinged or pivoted to the clips L, secured to the cross-bar of the thills. To the upper face of the rear bar of the foot-rest are secured the blocks M, which are curved on their upper faces, forming seats for the lower curved ends of the ogee springs M', which are adjustably secured thereto by means of the clips M². The upper ends of the said springs are loosely connected by means of the links M³ to a spring-bail, N, which is loosely fastened to the under side of a bar, R, by means of a clip, R'. The said bar is arranged to move in bearings or ways S attached to the bottom of the seat, and is perforated at intervals to receive a pin, T, for the purpose of adjusting the seat, the pin passing through a perforation in the seat, as shown. The letter U indicates two brace-rods extending from the thills to the axle for the purpose of strengthening the wagon.

The springs of the wagon may be of any of the usual styles; but I prefer to use leaf-springs, as shown.

As thus constructed it will be perceived that the spring and axle can oscillate independently of each other, and as the seat-supports, as well as the foot-rest, are secured to the spring located under the axle it is evident that the disagreeable motion of the axle will not be imparted to the seat, thus forming an extremely easy-riding vehicle. The foot-rest of the wagon being also loosely connected to the spring and to the thills gives further freedom of motion to the seat, as will be evident.

By means of the sliding bar, the yoke or bail connected thereto and to the ogee springs, it will be seen that the tension of the springs may be varied so as to adjust the seat to support light or heavy weights at will by simply withdrawing the pin T, shifting the sliding bar, and again fastening it by means of the pin into its newly-adjusted position.

Another object in providing for the adjustment of the tension of the ogee springs is to enable a person to readily adjust the load upon the horse, so that although the weight of the riders may vary the pressure upon the horse may be always practically the same. Thus by moving the sliding bar under the seat forward the downward pressure or tendency upon the thills will be increased, and vice versa.

Having thus fully described my invention, what I claim as new, and desire to secure by Letters Patent, is—

1. In a road-cart of the character described, the combination, with the axle, the thills rigidly secured to the axle, the couplings F, hung loosely to the under side of the axle by means of the rings E and the clips D, the latter being bolted firmly to the axle, the spring G, pivotally hung to the said couplings in line with the axle, and the foot-rest hinged to the spring and thills, of the seat-standards and seat, whereby the said axle and thills may oscillate without oscillating the spring G and the seat mounted upon the same, substantially as described.

2. The combination, with the foot-rest and the ogee springs, of the spring-bail loosely connected to the ogee springs, the adjustable sliding bar beneath the seat, to which the bail is secured, and the adjusting-pin and seat, whereby the vehicle can be adapted and balanced to a light or heavy driver, substantially as specified.

3. The combination, with the spring loosely connected with the axle, of the loosely-connected foot-rest, the seat-supports, the ogee springs, and the seat, all arranged to operate substantially as specified.

4. The combination, with the spring loosely connected to the axle, of the foot-rest, the seat-supports and seat, and the ogee springs and adjustable bar, whereby the tension of the springs may be adjusted to adapt the seat to light or heavy weights, substantially as set forth.

5. The combination of the axle, the spring loosely hung thereto, so as to oscillate independently of it, the seat-standards and seat, and the ogee springs mounted on the foot-rest and adjustably attached to the bottom of the seat, substantially as described.

In testimony whereof I affix my signature in presence of two witnesses.

CHARLES L. BARRETT.

Witnesses:
OGDEN TOMLINSON,
JOHN STOCKDALE.